(12) United States Patent
Cogburn (10) Patent No.: US 11,624,390 B2
(45) Date of Patent: Apr. 11, 2023

(54) WALL HOOK AND ANCHOR NAIL FASTENING SYSTEM

(71) Applicant: Melanie Jo Cogburn, Austin, TX (US)

(72) Inventor: Melanie Jo Cogburn, Austin, TX (US)

(*) Notice: Subject to any disclaimer, the term of this patent is extended or adjusted under 35 U.S.C. 154(b) by 11 days.

(21) Appl. No.: 17/393,796

(22) Filed: Aug. 4, 2021

(65) Prior Publication Data

US 2021/0364027 A1 Nov. 25, 2021

Related U.S. Application Data

(63) Continuation-in-part of application No. 16/913,723, filed on Jun. 26, 2020, now Pat. No. 11,111,942, which is a continuation-in-part of application No. 15/701,080, filed on Sep. 11, 2017, now abandoned.

(60) Provisional application No. 62/364,098, filed on Jul. 19, 2016.

(51) Int. Cl.
| | |
|---|---|
| A47H 1/142 | (2006.01) |
| F16B 15/02 | (2006.01) |
| F16B 15/00 | (2006.01) |
| A47G 1/17 | (2006.01) |
| F16M 13/02 | (2006.01) |
| A47G 1/20 | (2006.01) |
| F16B 45/00 | (2006.01) |

(52) U.S. Cl.
CPC ............... *F16B 15/02* (2013.01); *A47G 1/17* (2013.01); *A47G 1/20* (2013.01); *F16B 15/0023* (2013.01); *F16B 45/00* (2013.01); *F16M 13/02* (2013.01)

(58) Field of Classification Search
CPC ...... F16B 15/02; F16B 15/0023; F16B 45/00; A47G 1/17; A47G 1/20; F16M 13/02
USPC ................................................ 248/547, 206.1
See application file for complete search history.

(56) References Cited

U.S. PATENT DOCUMENTS

| | | | | |
|---|---|---|---|---|
| 2,237,741 A | * | 4/1941 | Lindsley | F16B 15/02 411/923 |
| 2,795,836 A | * | 6/1957 | Nagin | E01C 19/502 411/456 |
| 4,708,552 A | * | 11/1987 | Bustos | F16B 13/126 248/231.91 |
| 5,011,354 A | * | 4/1991 | Brownlee | F16B 21/086 411/487 |
| 6,206,334 B1 | * | 3/2001 | Week | A47G 1/17 248/467 |
| 7,594,636 B2 | * | 9/2009 | Wong | A47G 1/22 248/205.3 |
| 7,744,323 B2 | * | 6/2010 | Kim | F16B 15/06 411/451.3 |
| 8,844,886 B2 | * | 9/2014 | Mejia | A47G 1/20 248/216.4 |
| 9,080,587 B1 | * | 7/2015 | Smith | A63C 19/00 |
| 2006/0115346 A1 | * | 6/2006 | Huang | F16B 15/06 411/418 |
| 2007/0295879 A1 | * | 12/2007 | Wong | A47G 1/20 248/475.1 |

(Continued)

*Primary Examiner* — Nkeisha Smith
(74) *Attorney, Agent, or Firm* — Matthew Burr (57) ABSTRACT

A hook mounting system of a unibody structure with three platforms that face an angled hole. The hook system includes nails adapted to be particularly suitable for mounting the hook and platform deformable inserts to receive the nails. The system is adapted for a rod hanging assembly. The system includes a nail having a non-circular shank portion and a head portion.

31 Claims, 10 Drawing Sheets

(56) References Cited

U.S. PATENT DOCUMENTS

| | | | | |
|---|---|---|---|---|
| 2008/0251682 A1* | 10/2008 | Repac | ............... | A47G 1/20 |
| | | | | 248/304 |
| 2010/0213333 A1* | 8/2010 | Mejia | ............... | A47G 1/22 |
| | | | | 248/220.21 |
| 2010/0294910 A1* | 11/2010 | Grant Orsini | ............ | A47G 1/20 |
| | | | | 248/475.1 |
| 2015/0097100 A1* | 4/2015 | Lin | ............... | F16M 13/027 |
| | | | | 248/216.1 |
| 2015/0108304 A1* | 4/2015 | Larsen Roldan | ........ | A47G 1/20 |
| | | | | 248/216.1 |
| 2021/0062966 A1* | 3/2021 | Woolman | ............... | A47G 1/22 |

* cited by examiner

WALL HOOK AND ANCHOR NAIL FASTENING SYSTEM

CROSS-REFERENCE TO RELATED APPLICATIONS

This application is a continuation-in-part of U.S. patent application Ser. No. 16/913,723, filed Jun. 26, 2020, and is related to and claims the benefit of U.S. patent application Ser. No. 15/701,080, filed Sep. 11, 2017 and further is related to and claims the benefit of U.S. provisional patent application Ser. No. 62/394,098, filed Sep. 13, 2016, the disclosures of which applications are incorporated herein by reference.

TECHNICAL FIELD

This disclosure relates generally to wall mountings or objects suitable to be attached to a vertical surface, and more particularly to wall mountable hooks for household or other suitable uses, and systems for mounting same.

BACKGROUND

The problem sought to be solved is to provide a large wall hook or other fixture that a person can mount on a surface such as a wall by hammering one or more nails into the surface through a mounting potion of the hook or other fixture. Traditionally, installation of such fixtures require the use of wall anchors, which affix into the drywall or friable materials, allowing the user to affix the fixture by screwing fasteners into the wall anchor. Drywall anchors are very well suited for this purpose, and they lodge into the drywall or friable materials by displacing that material. However, such drywall anchors require several steps to install. The user typically drills a large hole into the drywall, hammers in the drywall anchor, and then screws the fixture into the wall anchor with a screw. One object of the invention is to avoid using a drill, and to create a system for easy installation of large fixtures onto walls without requiring a drill or multitude of steps. Another object of the invention is to reduce the damage to the wall caused by traditional drywall anchors, which leave a large hole when removed.

Currently the options for "no-drill" installation of fixtures onto walls are extremely limited. No-drill hooks are currently limited to hooks that attach to wall with adhesives of different types, including Command™ hooks by 3M. However, these hooks are extremely limited in how much weight they can carry. Other options, which do require a screwdriver or a drill, include anchors that drill into the wall and also fasten the fixture—a one-step drilling anchor. These wall anchors have a pointed cutting end and large threads, which are adapted to in a single step, be rotatively driven in the wall thereby drilling their own hole in the wall with the large threads of the anchor compacting the gypsum and becoming firmly set therein. These types of anchors must be installed by way of a screwdriver and typically by a power driven screwdriver bit. U.S. Pat. No. 5,944,295 discloses such a system. However, like any wall anchor, this system causes damage to the walls when the anchor is removed, and requires a powered drill to facilitate installation. It is also known in the art that very small pin nails, when installed on an angle, will securely fasten a picture hanger on the wall and carry extremely large loads. Such hangers are known as "Ook-Hooks™," and a major benefit of "Ook-Hooks™" is that when they are removed they leave very small nail holes in the drywall, which is desirable. However, the use of pin nails is limited to static loads and the utilization of pin nails to attach large fixtures, such as hooks, towel rods or the like, is not feasible, as they will easily loosen from the wall. Another option is the saber tooth wall anchor, which is a wall hook featuring a curved saber tooth on the back, which is rotationally pushed into the gypsum wall board. This system is described in U.S. Pat. No. 8,414,239 B2. However, such systems are limited in size and not suited to larger fixtures. Following this, recent development in mounting systems includes a push pin bracket, marketed as "High and Mighty™," which is advertised as a "tool-free" bracket featuring angled tacks that attaches to the wall by rotationally pushing the bracket onto the wall. Fixtures are then attached to the bracket. However, both these tacked brackets are difficult to install if the user has limited hand strength, and they are difficult to align.

SUMMARY OF THE INVENTION

It is therefore an aim of the present invention to provide a novel wall anchor and fastening system of simple construction and simple installation. The current invention establishes a new method for anchoring fixtures onto a gypsum wall, by utilizing a fixture with a wide circular platform, a guide hole for receiving a nail within the platform, and deformable material such as plastic or wood immediately surrounding that guide hole. A specially designed nail, manufactured from a traditional wire round nail, featuring a large wide head, a pointed distal end, a lower round shank, and an upper shank which is stamped to create a widened and flattened cross-section, is then inserted into the guide hole. Because the upper stamped portion of the wire nail is wider at its major axis than the diameter of the guide hole, the upper nail shank will deform the guide hole and pocket surrounding the guide hole, and become lodged very tightly into the fixture through wedging forces such that it cannot be easily removed. The nail also features a wide head, in this case shaped like a head nut, to apply forces on the platform of the fixture. The combined forces wedges the nail into the fixture, and with application of the wide nail head onto the platform applies force onto the fixture, making the fixture stable on the wall, and making the fixture able to handle large, repeated loads. However, because only the lower round wire shank of the nail goes into the drywall, minimal damage is made to the wall itself. This fastening system thus has many benefits compared to the prior art. First, the fixture can be affixed to the wall with a small hammer. No electric tools such as drills are needed. Second, the fixture can be attached in one step. Third, when it is removed, there is minimal damage to the wall, only a small nail hole. However, because the anchor nail becomes lodged into the fixture, and lodged tightly, it cannot be easily removed or pulled out. The fixture in its preferred embodiment is removed by knocking upwards on the fixture at its base. After the fixture is removed from the wall, the nails can then be pulled out by pliers applied to the large nail heads.

The described nail is unique, and is particularly suited for attaching large fixtures to vertical surfaces. Because it has a sharp distal end and lower round shank whose diameter is smaller than the diameter of the guide hole, the lower body of the nail can be easily positioned into the fixture while the user moves the fixture with their hand to determine the best position for the fixture, while holding a hammer in the other hand. Once the user has selected a suitable location for the fixture, the user can quickly hammer the lower round shank of the nail through the fixture and into the drywall. Minimal force is needed to drive the lower shank of the nail into the wall as the wall is typically gypsum and the lower shank of the nail is small and round. After such minimum effort is applied, the upper stamped portion of the nail, which is both widened and flattened, will abut the guide hole, and the user then applies increased and substantial force to drive the nail and the upper shank flared portion into the fixture. Once the nail is driven in such manner, the nail is lodged into the fixture and not readily susceptible to loosening from the fixture due to vibrational forces. This nail has other applications such as upholstery, or attaching fabric to wood. This is because the upper stamped shank creates an additional wedging force keeping the nail secure into the body sought to be attached such as the wood of the furniture. It should be noted that such a nail, suitable for this fastening system, is not known in the art. Since the late 19$^{th}$ century, nails have been made from round wire and known as "wire nails." Long wires are fed into various machines, and then cut and formed to create the sharp distal points and head of the nail. Wire nails thus have round shanks, and are uniform in diameter and symmetrical. See Mark Chervenka, "Nails as Clues to Age," at https://www.realorrepro.com/article/Nails-as-clues-to-age for a discussion of the history of nails. Round wire nails have limited wedging forces, as the force of the nail only operated axially, and are generally considered inferior in gripping ability to older "cut nails" which feature a tapered rectangular shank. Older cut nails have a greater wedging force because as the nail is driven into wood, the wood fibers are wedged downward, and as they spring back they act as barbs on the nail achieving greater grip than round wire nails. While several attempts to modify the round shank nail to increase its surface area or gripping strength (see e.g., U.S. Pat. Nos. 5,253,965, 4,973,211, 5,230,597) such attempts have been limited to deformed shank nails like ring shank nails, wherein the nail shank is texturized, grooved, or in the case of U.S. Pat. No. 5,230, 597, welding a twisted fin onto a large cylindrical shank. The present invention contemplates an improved nail that is easy to manufacture. The suitable nail for this fastening system thus requires a nail created from a wire that features a round lower shank, that can be easily be positioned in the guide hole of the fixture, but with an upper shank which is modified to lodge into the guide hole and a large nail head that approximates the size of a nut cap, which is easy to hammer such that the nail head is sufficiently large that hitting the head will not strike the fixture. In the preferred embodiment, the anchor nail is created from round wire, which is formed into a nail having a cut pointed distal end, a round lower shank, an upper shank that is stamped to create a flattened/widened upper shank portion. In order to attach the large nail head to the shank, the preferred method is to keep a portion above the upper shank rounded/undeformed, then thread it. The threaded stem, can then be glued or welded into a large nut with internal threads.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

The following discussion is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Drawings are not necessarily to scale or in proportion where needed to clearly illustrate a feature.

In the following discussion and in the claims, the terms "including" and "comprising" are used in an open-ended fashion, and thus should be interpreted to mean "including, but not limited to." Also, the term "connect" or "connected" where used if at all is intended to mean either an indirect or direct connection. Thus, if a first component connects to a second component, that connection may be through a direct connection or through an indirect connection via other components and connections.

Certain terms are used throughout the following description and claims to refer to particular system components and method steps. As one skilled in the art will appreciate, different companies may refer to a component by different names. This document does not intend to distinguish between components that differ in name but not function.

The problem sought to be solved is to provide a large fixture that a person can mount onto a vertical surface comprising friable or gypsum board by hammering one or more nails into the surface through a mounting potion of the fixture. One object of the invention is to avoid using a drill, such as to drill hole into the surface as a guide hole and then nail or screw in a hook with drywall anchors.

Figure 1:
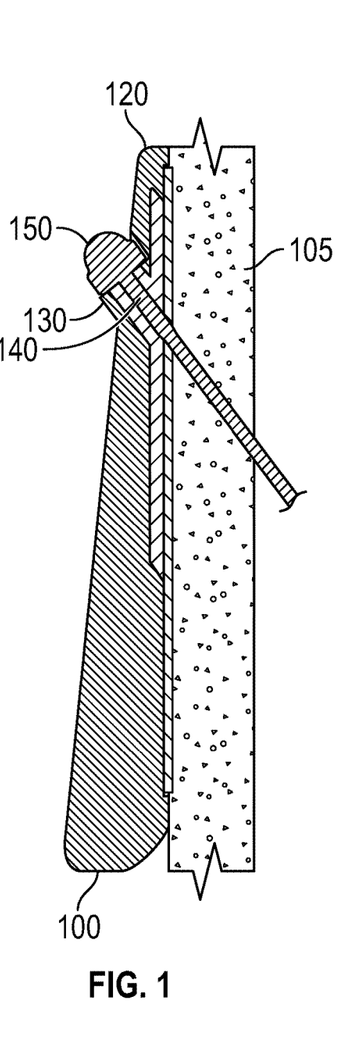
FIG. 1 is a vertical side view cross-section diagrammatic illustration of an exemplary embodiment of a hook of the present disclosure.
Figure 2:
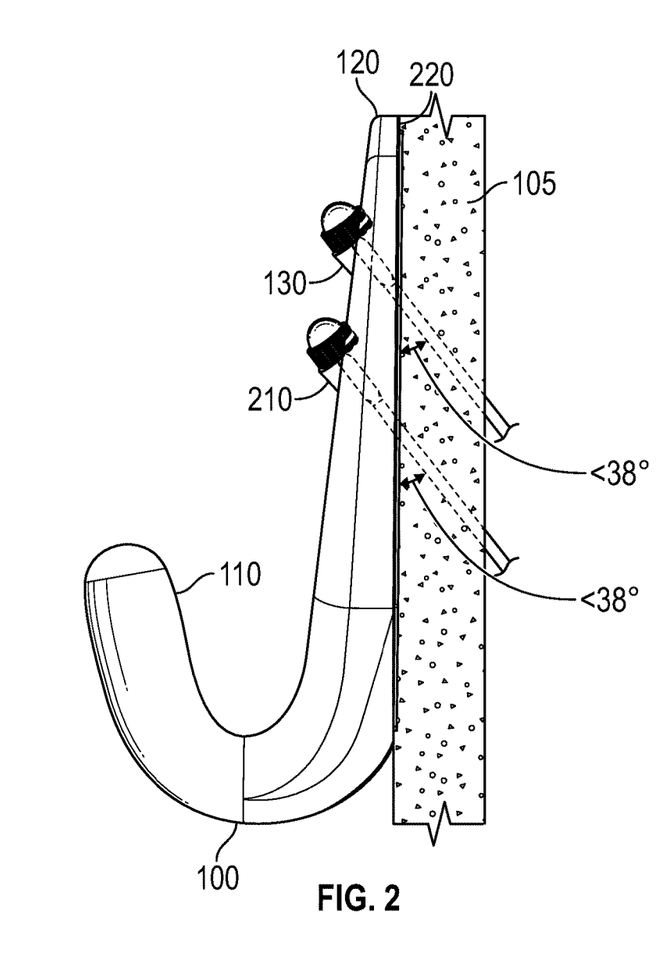
FIG. 2 is a vertical side view diagrammatic illustration of a detail of an alternative embodiment of the hook of FIG. 1 showing hidden parts with dashed lines.

Refer now to both FIGS. 1 and 2. FIG. 1 is a vertical cross-section view diagrammatic illustration of an exemplary embodiment of a hook of the present disclosure, which is a large hook of approximately 5 inches in length and 2 inches wide. Hook 100 includes top portion 120 and platform 130 below top portion 120 and hook portion 110 below platform 130, 210. Nail 140 is disposed through guide hole 310 and penetrates in a hanging substrate 105 such as drywall. Nail head 150 rests on top of platform 130.

FIG. 2 is a vertical side view diagrammatic illustration of a detail of an alternative embodiment of the hook of FIG. 1 showing hidden parts with dashed lines. The embodiment of FIG. 2 provides a plurality of platforms 130, 210 through which to drive a nail 140. Nails 140 penetrate substrate 105 at preferred angle of 38°. Backing piece 220 rests against substrate 105.

Figure 3:
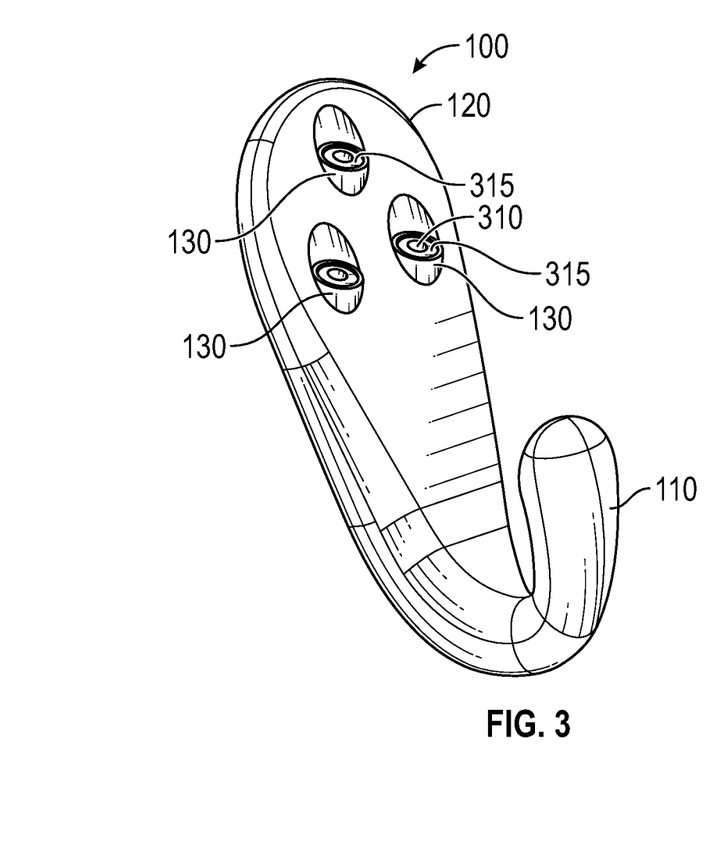
FIG. 3 is a perspective vertical view diagrammatic illustration of an exemplary embodiment of a hook of the present disclosure.

FIG. 3 is a perspective vertical view diagrammatic illustration of an exemplary embodiment of a hook of the present disclosure. Platforms 130 provide guide holes 310 for nails 140. Annular portion 315 around guide hole 310 comprises a sleeve portion disposed in guide hole 310 wherein the sleeve portion consists of a deformable material. A nail of the present system having a flattened portion 745 of the upper shank of the nail such that the flattened portion extends outward from the circular body 740 of the shank, such as the nail of FIG. 9, that is hammered into guide hole 310 will deform the deformable sleeve 315 around flattened nail portion 745 to provide a tight friction fit of the nail in guide hole 310. Such an embodiment of the present system is advantageous for embodiments in which hook 100 is made from a non-deformable material such as metal or ceramic. Embodiments in which hook 100 is made from a deformable material such as plastic can omit sleeve 315 from guide hole 310 provided that guide hole 310 is sized to provide a tight friction fit around the nail. Additionally, note the bulk of hook 100. It is intended for robust use and can be easy to install and remove with minimal tools.

Figure 4:
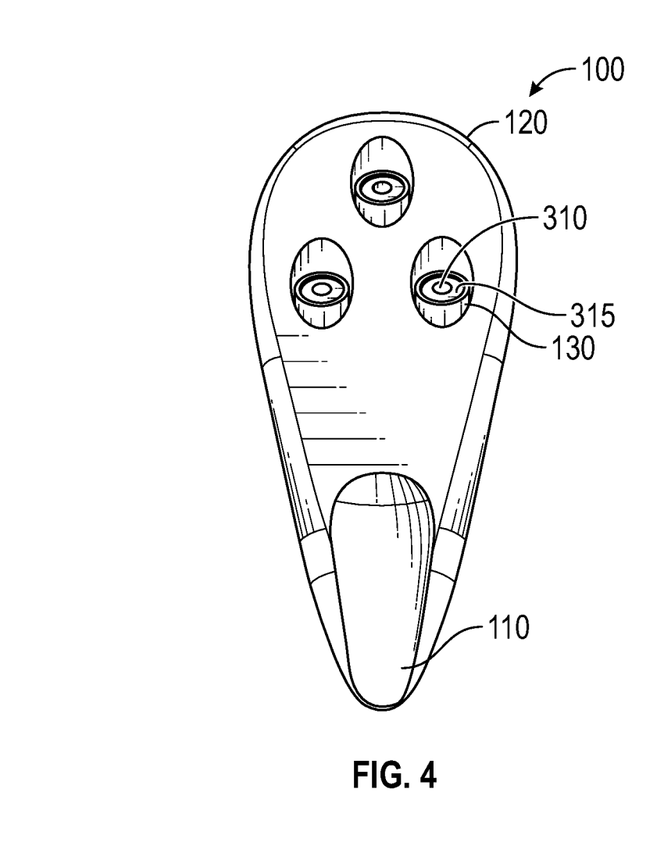
FIG. 4 is a vertical front view diagrammatic illustration of an exemplary embodiment of the hook of FIG. 3.

FIG. 4 is a vertical front view diagrammatic illustration of an exemplary embodiment of the hook of FIG. 3. Hook body 220 is scalloped in portions to accommodate angled platforms 130. The angled platforms 130 provide angled guide holes 310 so that nails 140 penetrate the hanging substrate 105, such as a wall, at an angle to provide a secure purchase for the hook against the substrate.

Figure 5:
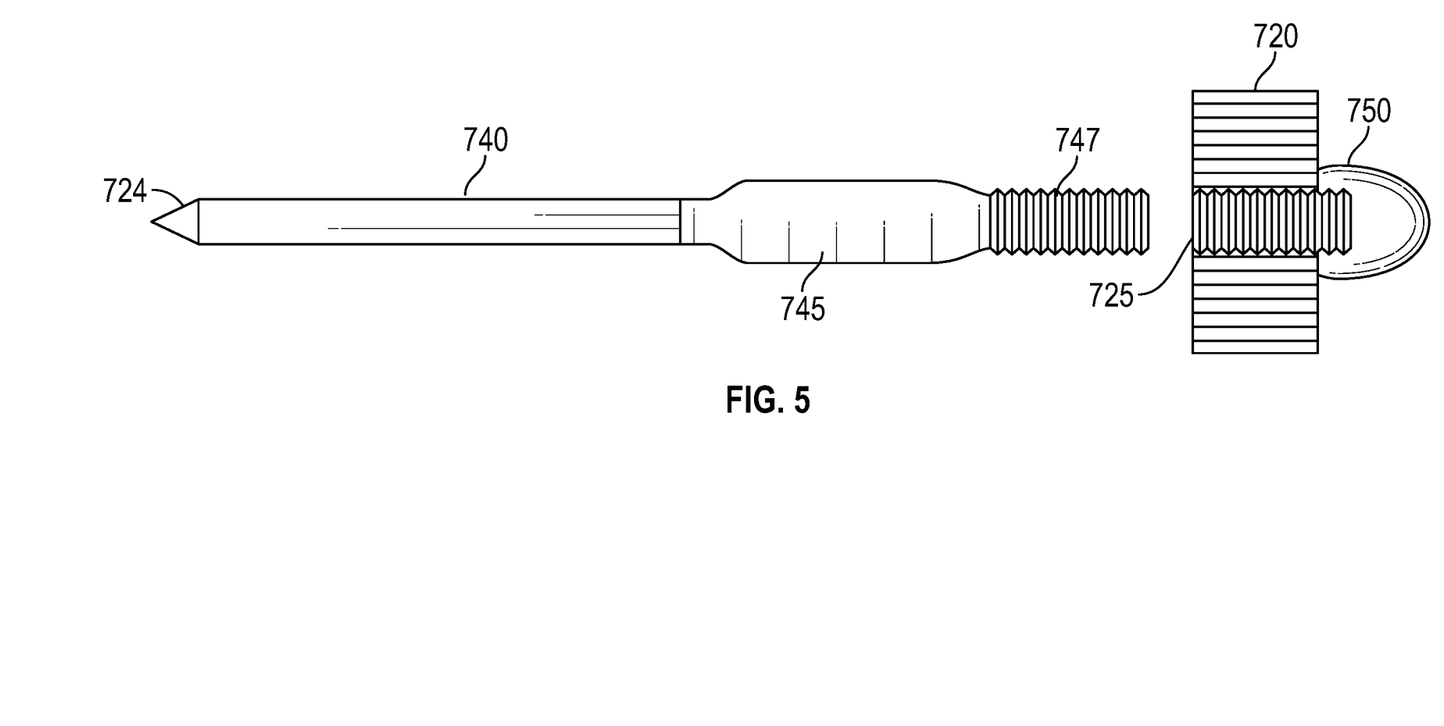
FIG. 5 is an exploded view of an exemplary embodiment of a preferred nail of the present invention.

FIG. 5 is an exploded view of an exemplary embodiment of a preferred nail of the present invention. A preferred nail can be obtained by flattening or stamping the round wire shank 740 at the upper portion 745 of the nail. Use of a stamp to flatten the round wire shank provides an economical method of manufacturing the nail to achieve an upper flared portion that lodges in the plastic sleeve. The term shank refers to the main body of a nail, which typically has a substantially circular horizontal cross-section because nails are typically manufactured by shaping a length of wire that has a circular horizontal cross-section. In addition to stamping an upper portion 745 of shank 740 to form a flattened portion that has a non-circular horizontal cross-section, a further upper portion 747 is machined to create threads. Head piece 750 is machined to form corresponding internal threads 725 that engage the threads of portion 747. The shape of the head in FIG. 5 is slightly distorted from the other drawings to more easily illustrate the internal threads. Head piece 750 further provides in a preferred embodiment toothed or knurled portion 720. Portion 720 is textured with knurling to enhance tool grip of head 750 for removal of the nail. At the terminus 742 distal from head 750, shank 740 is shaped to provide an angled point to facilitate driving of the nail into a substrate such as drywall.

Figure 6:
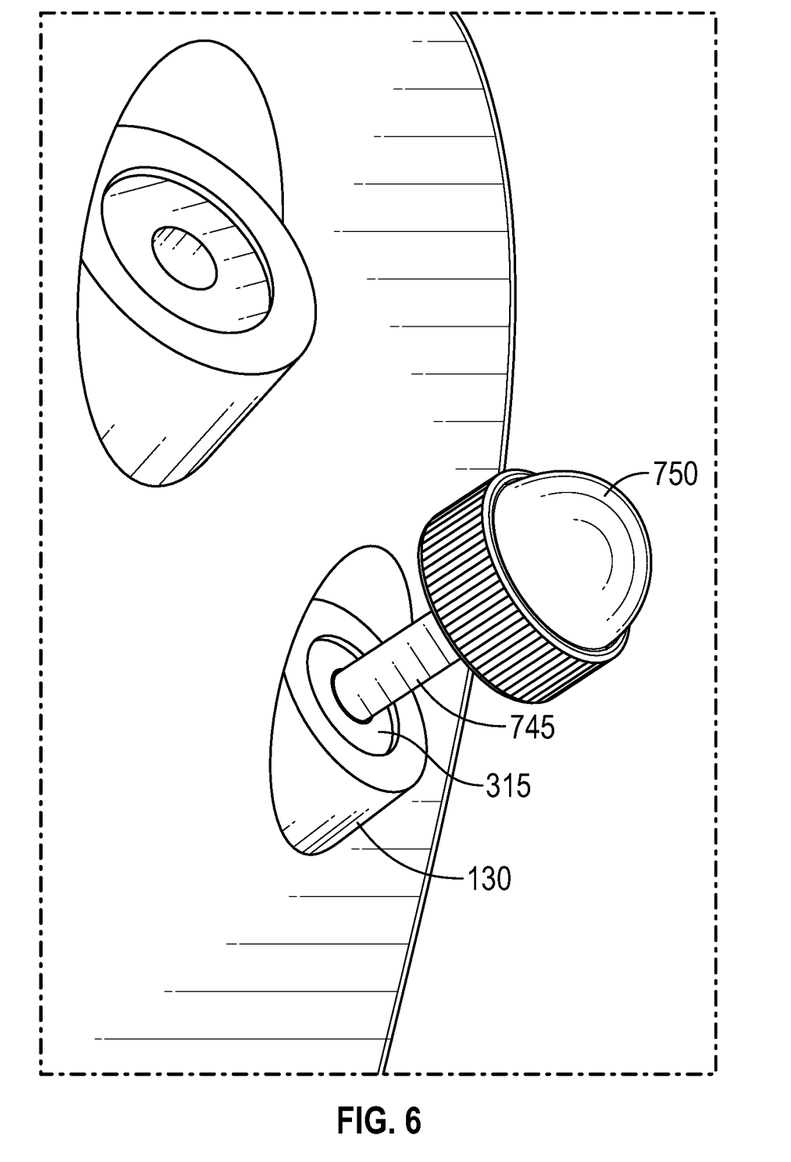
FIG. 6 is a perspective view diagrammatic illustration of an exemplary embodiment of a nail and guide hole of the hook of FIG. 4.

FIG. 6 is a perspective view diagrammatic illustration of an exemplary embodiment of a nail and guide hole of the hook of FIG. 4. Preferably a nail 140 of a hook system of the present invention is created such that the nail contains a sharp distal end, a lower round shank, and an upper flattened shank 745, as described above, whose circumference has been widened at two points, when compared to the lower round shank body. This nail with its widened, flattened upper shank 745 is designed to achieve a tight fit in the guide hole in platform 130. Specifically, the flattened/widened portion of the nail becomes lodged in the sleeve 315. In the preferred embodiment, the nail cannot be pulled from the fixture when installed on the wall. To remove the fixture/hook, the user hits the bottom of the hook with a upward motion, which pops the fixture and nails lodged therein from the wall. Once the fixture is removed from the wall the nails can be pulled out with pliers Nail head 150 is formed with ribs 720 or other suitable topographical features such as knurling to facilitate removal of nail 140 with pliers or even by hand during the nail removal process.

Figure 7:
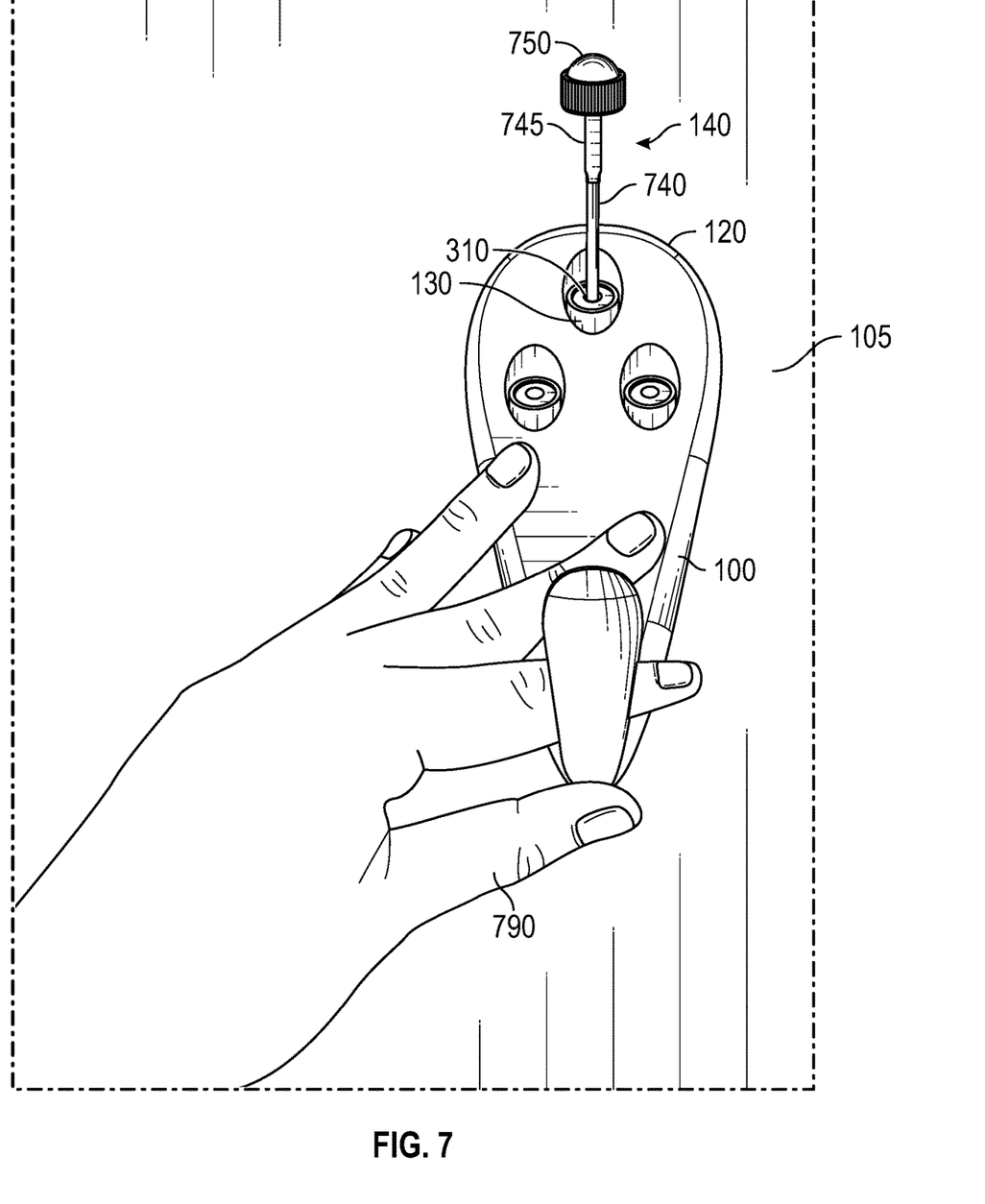
FIG. 7 is a perspective front view of an exemplary embodiment of a nail for a hook system of the present invention to illustrate hook hanging advantages.

FIG. 7 is a perspective front view of an exemplary embodiment of a nail for a hook system of the present invention to illustrate hook hanging advantages. In a preferred embodiment, a top nail is centered for ease of installation such that the top nail is installed first to position the hook on a surface, and then one or more secondary nails are installed below the top nail.

Nail 140 is disposed in platform 130 guide hole 310 at the top 120 of hook 100 and penetrates substrate 105 to slightly suspend hook 100 on substrate 105. The position of hook 100 can be selectively adjusted manually 790 to the user's preference or to adapted to the substrate surface or other environmental circumstances. After the hook is positioned as desired by the user, nail 140 can be hammered into the substrate 105 to fix the position and then additional nails can be hammered into the remaining platforms to secure the hook to the substrate.

Figure 8:
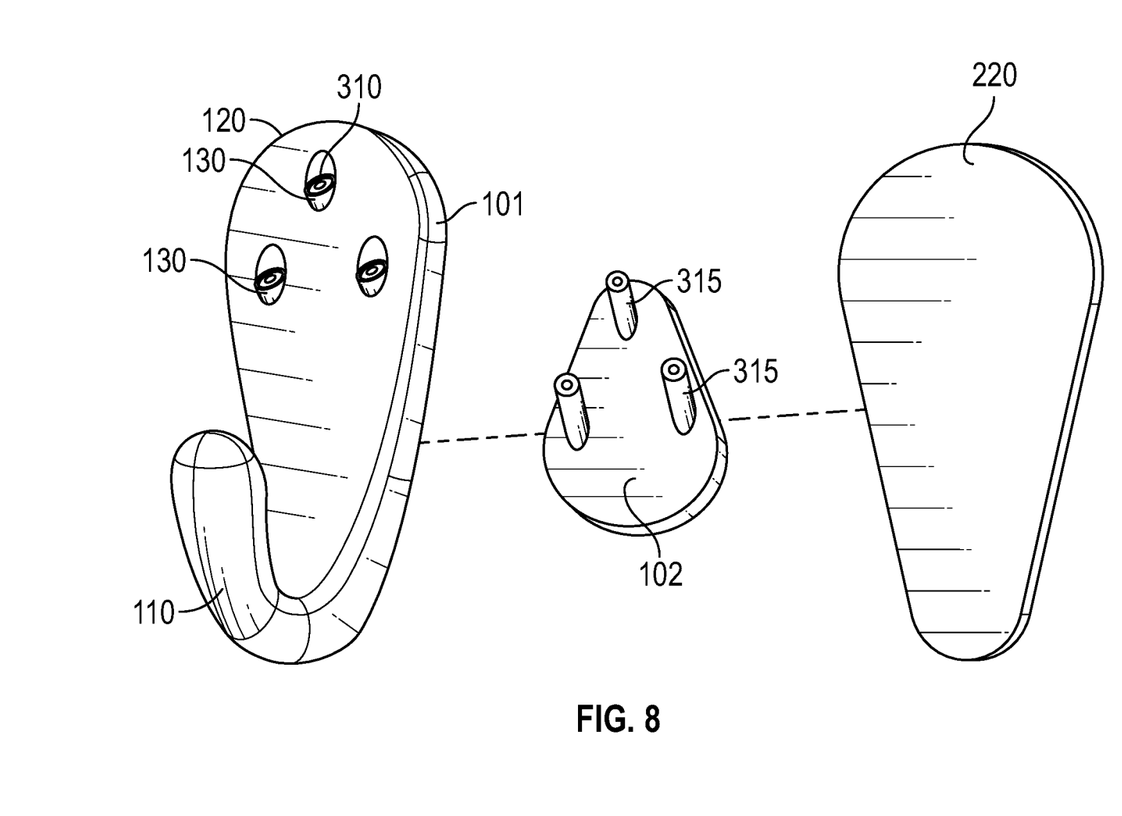
FIG. 8 is a perspective isometric exploded view diagrammatic illustration of an exemplary embodiment of a a hook of the present invention.

FIG. 8 is a perspective isometric exploded view diagrammatic illustration of an exemplary embodiment of a hook of the present invention. Front piece 101 provides hook portion 110, top portion 120 and platforms 130, as described above. Front piece 101 has a back side receptacle space (not shown) to receive insert piece 102. Insert piece 102 provides sleeve 315 elements that protrude upward from the front surface of insert piece 102 and which correspond to the guide holes 310 of front piece 101. Accordingly, insert piece 102 fits into the back side of front piece 101 such that the guide holes 310 receive the sleeve elements 315. Backing piece 220 affixes to the back side of front piece to provide extra retention of insert piece 102 and to provide a uniform surface for the hook to rest on a substrate such as wall. Backing piece 220 affixes to front piece 101 by any suitable means, including a snap fit into the receptacle space, by adhesive, or by a combinations of means.

Figure 9:
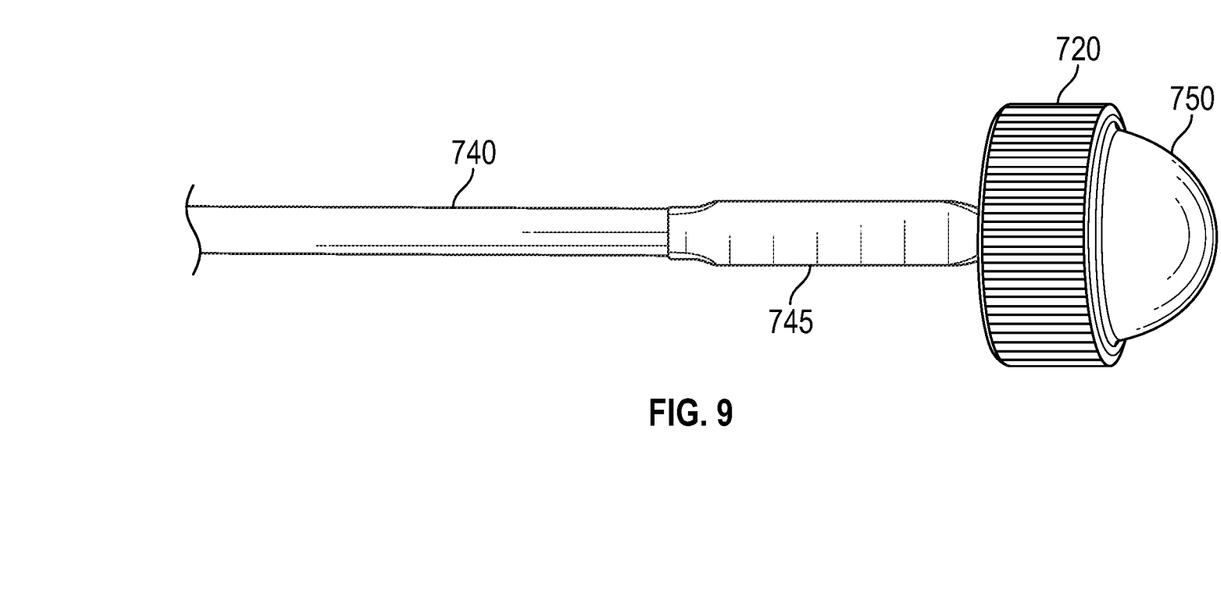
FIG. 9 is a perspective horizontal view diagrammatic illustration of an alternative embodiment of a portion of a nail of the present disclosure.

FIG. 9 is a perspective horizontal view diagrammatic illustration of the nail for a hook system of the present disclosure. The round shank of 740 formed from wire like a traditional wire nail, is flattened to create a flattened/widened portion 745. The flattened/widened top portion 745 provides a tight fit in guide hole 310, and its preferred embodiment, deforms the sleeve of 310 as the major axis of 745 at its cross section is greater than the diameter of the guide hole at 310. Nail head 750 provides ribbed portion 720 to facilitate removal of nail 740 from guide hole 310.

Figure 10:
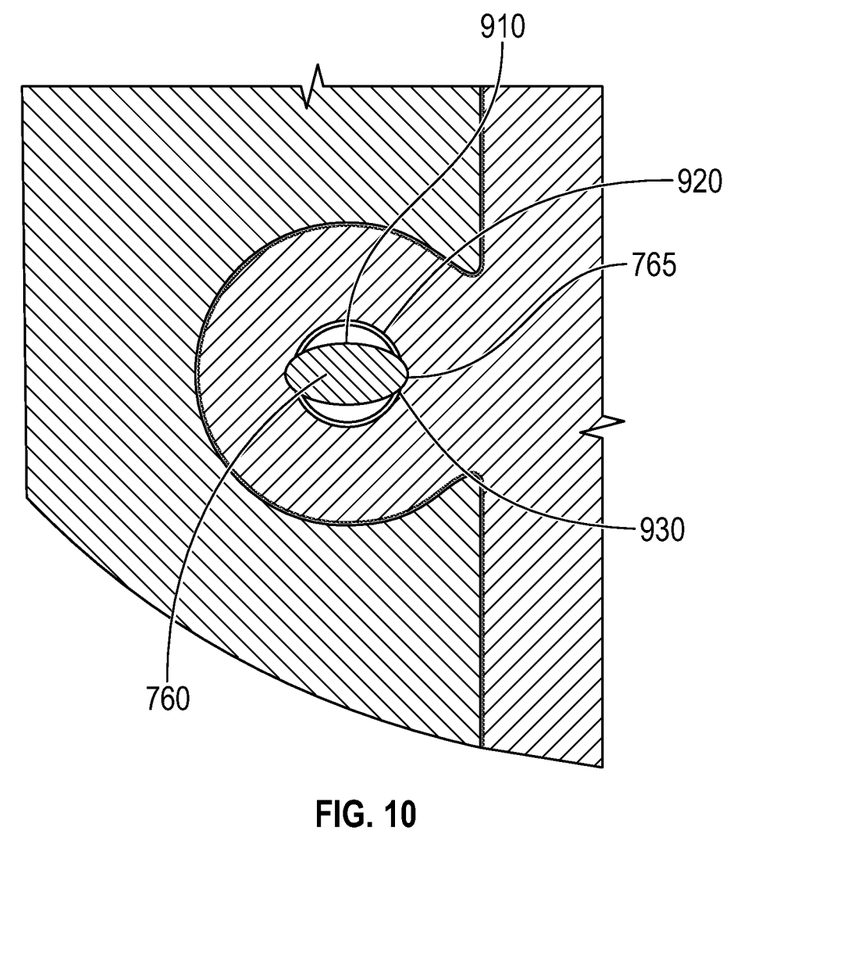
FIG. 10 is a top view cross-section diagrammatic illustration of a detail of a mounting system of the present disclosure.

FIG. 10 is a top view cross-section diagrammatic illustration of a detail of a mounting system of the present disclosure. A specific embodiment of the present mounting system provides nail 760 having an non-circular shape in cross-section through the width of the nail. The cross-section can be obtained by flattening or stamping the round wire shank at the upper portion of the nail. Use of a stamp to flatten the round wire shank provides an economical method of manufacturing the nail to achieve an upper flared portion that lodges in the plastic sleeve. The cross-section in this Figure appears ovoid due to deformation against guide hole 130 (or sleeve 315, as applicable, to form a tight friction fit. The deformation may affect both the nail and the deformable material around the nail.

Guide hole 910 receives nail 760. Guide hole 910 has a circular shape in horizontal cross-section with wall 920 around its circumference. The elongated cross-section of nail 760 terminates at a first end in terminus 765, which extends beyond the circumference of guide hole wall 920. The cross-sectional shape of guide hole 910 distorts at point 930, for example, from pressure by nail 760 to accommodate the ovoid shape of nail 760. The advantageous result being a tight friction bond between nail 760 and guide hole 910. In a preferred embodiment the fit of the nail in the guide hole is sufficiently tight so that the nail is bonded to the hook by the guide hole. The bond is so tight that nail 760 cannot be removed from guide hole 910, for all intents and purposes.

This tight friction bond of nail and hook hole differs from prior hook mounting systems. Prior hook mounting systems typically stabilize the fixture through a wall anchor which displaces the friable material of the drywall, to secure the wall anchor into the wall. This method however is created by creating create a tight friction fit between the nail and the guide hole of the hook or other fixture, and which also wedges the fixture or hook onto the wall by application of forces from the large nail head of 750 along the platform of 130, 210.

Figure 11:
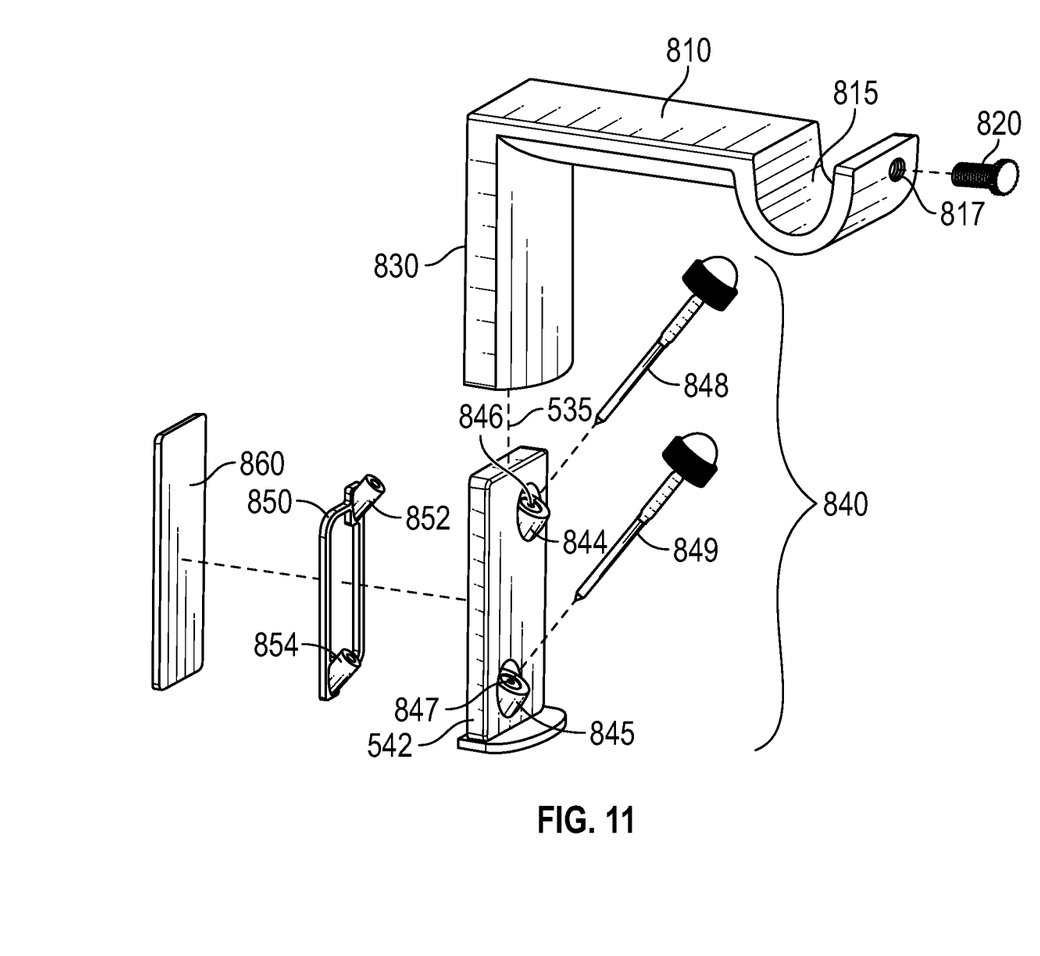
FIG. 11 is an isometric perspective exploded view of a curtain rod mounting system exemplary embodiment of the present invention.

FIG. 11 is an isometric perspective exploded view of a curtain rod mounting system exemplary embodiment of the present invention. The drapery rod bracket mounting system features a mounting bracket with two platforms that are offset. Anchor nails are driven into the mounting bracket, and the drapery bracket then slides over the mounting bracket.

L-shaped bracket 810 provides rod receptacle 815, which has rod-securing screw receiving hole 817. Hole 817 selectively receives screw 820. Screw 820 is selectively rotatable to tighten onto a rod (not shown) disposed in receptacle 815 to secure the rod in the receptacle or to selectively release a rod from the receptacle. Descending portion leg 830 of bracket 810 provides a sleeve receptacle to receive 535 mounting assembly 840.

Mounting assembly 840 includes (1) platform piece 542 provides angled platforms 844, 845 with guide holes 846, 847 to receive nails 848, 849, respectively; (2) Insert piece 850 provides deformable angled sleeves 852,854 that insert into platforms 844 and 845, respectively; and (3) backing piece 860 to retain insert piece 850 in platform piece 542. Backing piece 860 affixes to platform piece 542 by any suitable means, including a snap fit into the receptacle space, by adhesive, or by a combination of means.

Figure 12:
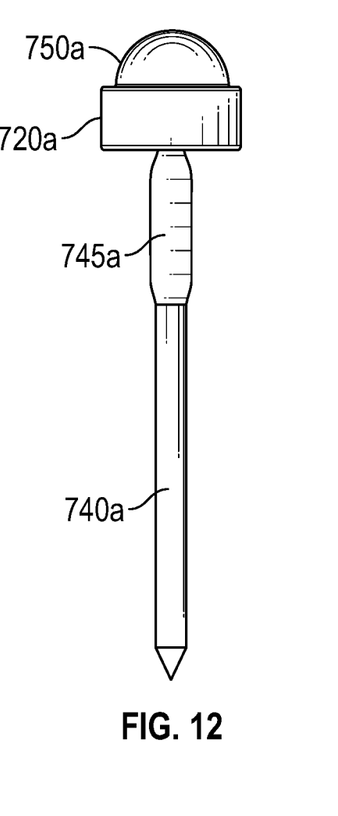
FIG. 12 is a vertical side view of a first side of an alternative exemplary embodiment of a nail of FIG. 9.

Returning to the nail component of the present system, a non-threaded nail is contemplated as an alternative embodiment. FIG. 12 is a vertical side view of a first side of an alternative exemplary embodiment of a nail of FIG. 9. The embodiment of FIG. 12 is not threaded. That is, alternative head portion 750a is formed with shank portion 740 as a unitary piece by, for example, being forged. Alternatively, head portion 750a is fastened to shank 740a by welding, adhesive or other suitable non-threaded means. Head portion 720a is not ribbed. Top portion 745a is flattened/widened as described in FIG. 9.

Figure 13:
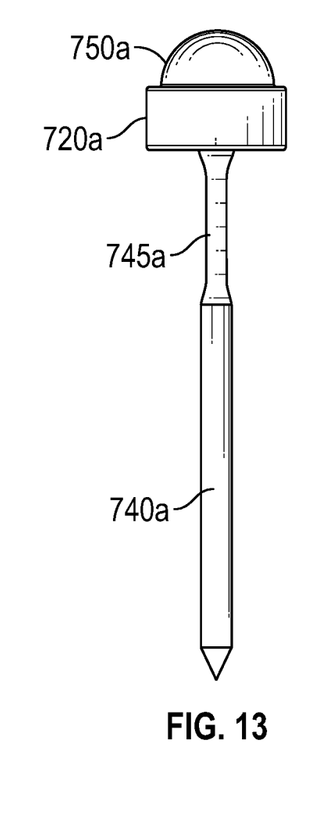
FIG. 13 is a vertical side view of a second side of the alternative exemplary embodiment of the nail of FIG. 12.

FIG. 13 is a vertical side view of a second side of the alternative exemplary embodiment of the nail of FIG. 12. Top portion 745a is viewed from the edge side to further illustrate the flattened/widened shape.

Figure 14:
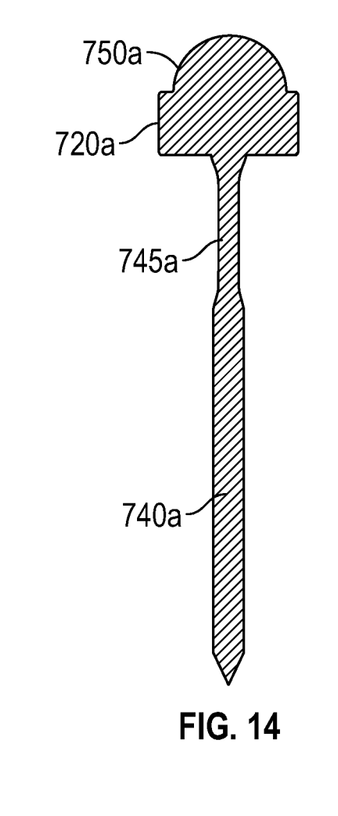
FIG. 14 is a vertical cross-section view of the view of the nail of FIG. 13.

FIG. 14 is a vertical cross-section view of the view of the nail of FIG. 13. FIG. 14 illustrates the lack of threading by which head 750 is attached to shank 740 in FIG. 9.

The curtain rod mounting assembly operates the same as the hook mounting system described above with respect to the interaction between the nail and the platforms. The nails used are the same as described above. Rod receptacle 815 houses the entire mounting assembly, including the nail heads, once bracket 810 is mounted on mounting assembly 840.

All prior mounting systems rely upon the friction fit of the wall anchor and the wall material to achieve the stability of the wall anchor, with the fixture then fastened into the wall anchor. The present invention presents a different method, relying on the friction between the anchor nail and fixture itself, which then obtains friction with the wall through a variety of forces, including the large surface area of the back of the fixture (which might have a rubber or silicone backing), and the applied pressure from the large nail head and platform which operates to wedge the fixture between the nail and wall.

Due to the improved method described herein, the hook design of the present invention can carry weight of at least 20 lbs and possibly as much as 80 lbs and can remain stable with repeated loads placed on the hook.

Hook comprises of a unibody structure with three platforms that face an angled hole. In an exemplary embodiment of the hook, the hole angle is 38 degrees.

The hook features one or more angled nail holes, combined with an increase in the thickness of the mounting portion of the hook such that the material of the hook is thickest at the hook end and thinnest at the top of the mounting portion of the hook. That is, a top nail hole, for example, is through a thinner, mounting, portion of the hook and the bottom nail holes, for example, are through a thicker place in the mounting portion, closer to the hook portion of the hook.

The platform and nail head are arranged and shaped so that when one hammer in the nail hook the hammer does not strike the hook itself.

Other applications include any brackets that are mounted to wall—the under bracket for towel rods, or drapery pole brackets, or picture hangers, or wall hooks of any size.

In a preferred embodiment the material of the hook is transparent. This allows it to be installed over wallpaper or high design environment and allows the paint/wall covering to show through, making appearance of large hook less distinguishable or obvious from view.

Many modifications and other embodiments of the wall hook and system described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

I claim:
1. A wall hook mounting system, the system comprising:
 a. a hook consisting of a front piece having a hook portion and one or more angled platforms wherein each one of the one or more platforms has a sleeve guide hole to receive a deformable sleeve from an insert piece, an insert piece having one or more angled deformable sleeves wherein each of the one or more sleeves has a nail-receiving guide hole, and a backing piece to secure the insert piece to the front piece, the hook portion being further characterized by a tapered shape such that a top portion progressively thickens to a bottom portion that is relatively thicker than the top portion; and
 b. one or more nails, at least one of the one or more nails having a head and further consisting of a lower shank portion having a circular horizontal cross-section with a circumference and an upper shank portion proximate to the head and having a non-circular horizontal cross-section such that at least a portion of the upper shank portion extends beyond the circumference of the lower shank portion,
 whereby the upper shank portion having a non-circular horizontal cross-section deforms the deformable sleeve of the hook such that the at least one nail bonds to the hook with a tight friction fit.

2. The wall hook mounting system of claim 1, wherein at least one of the one or more angled platforms act as a stop for the nail head.

3. The wall hook mounting system of claim 1, wherein at least one of the one or more angled platforms is at an angle of 38 from vertical.

4. The wall hook mounting system of claim 1, wherein the non-circular cross-section comprises a substantially rectangular shape.

5. The wall hook mounting system of claim 1, wherein the front piece of the hook is non-deformable.

6. The wall hook mounting system of claim 1, wherein the front piece of the hook is deformable.

7. The wall hook mounting system of claim 1, wherein the front piece has a receptacle and the backing piece snaps into the receptacle.

8. The wall hook mounting system of claim 1, wherein the backing piece attaches to the front piece with adhesive.

9. The wall hook mounting system of claim 1, wherein at least one of the one or more nails provides a top threaded portion and a head having internal threads to threadedly attach the head to the threaded top portion.

10. The wall hook mounting system of claim 1, wherein at least one of the one or more nails provides a head having a knurled portion.

11. The wall hook mounting system of claim 1, wherein at least one of the one or more nails has a head portion that extends from the top portion by non-threaded means.

12. A rod hanging system, the system comprising:
 a. a bracket piece to hold a rod, the bracket piece having a receptacle to receive a mounting assembly; and
 b. a mounting assembly, the mounting assembly consisting of a platform piece having one or more angled platforms wherein each one of the one or more angled platforms has an insert-receiving guide hole, an insert piece having one or more deformable angled sleeves that mate with the insert-receiving guide holes of the platform piece, and a backing piece to retain the insert piece to the platform piece, wherein the mounting assembly inserts into the receptacle of the bracket; and
 c. one or more nails, at least one of the one or more nails having a head and further consisting of a lower shank portion having a circular horizontal cross-section with a circumference and an upper shank portion proximate to the head and having a non-circular horizontal cross-section such that at least a portion of the upper shank portion extends beyond the circumference of the lower shank portion and the at least one nail has a pointed terminus distal from the head,
 whereby the upper shank portion having a non-circular horizontal cross-section deforms at least one of the one or more the deformable sleeves of the insert piece such that the at least one nail bonds to the mounting assembly with a tight friction fit.

13. The rod hanging system of claim 12, wherein the one or more angled platforms act as a stop for the nail head.

14. The rod hanging system of claim 12, wherein at least one of the one or more angled platforms is at an angle of 38 from vertical.

15. The rod hanging system of claim 12, wherein the non-circular cross-section of the upper shank portion comprises a substantially rectangular shape.

16. The rod hanging system of claim 12, wherein the platform piece is non-deformable.

17. The rod hanging system of claim 12, wherein the platform piece is deformable.

18. The rod hanging system of claim 12, wherein the platform piece has a receptacle and the backing piece snaps into the receptacle.

19. The rod hanging system of claim 12, wherein the backing piece attaches to the platform piece with adhesive.

20. The rod hanging system of claim 12, wherein at least one of the one or more nails provides a top threaded portion and a head having internal threads to threadedly attach the head to the threaded top portion.

21. The rod hanging system of claim 12, wherein at least one of the one or more nails provides a head having a knurled portion.

22. The rod hanging system of claim 12, wherein at least one of the one or more nails has a head portion that extends from the top by non-threaded means.

23. A nail consisting of a lower shank portion having a circular horizontal cross-section with a circumference and an upper shank portion having a non-circular horizontal cross-section such that at least a portion of the upper shank portion extends beyond the circumference of the lower shank portion; and a head connected to the upper shank portion, the head having a knurled portion.

24. The nail of claim 23, wherein the non-circular cross-section of the upper shank portion comprises a substantially rectangular shape.

25. The nail of claim 23, wherein the nail provides a top threaded portion and a head having internal threads to threadedly attach the head to the threaded top portion of the shank.

26. The nail of claim 23, wherein the nail provides a head having a knurled portion.

27. The nail of claim 23, wherein the nail has a head portion that extends from the top by non-threaded means.

28. A system for fastening a fixture to a vertical surface, the system comprising:
 a. a fixture consisting of a front piece having one or more angled platforms, each of the one or more angled platforms having a nail-receiving guide hole, each guide hole having a deformable interior portion; and b. one or more nails, at least one of the one or more nails having a head and further consisting of a lower shank portion having a circular horizontal cross-section with a circumference and an upper shank portion proximate to the head and having a non-circular horizontal cross-section such that at least a portion of the upper shank portion extends beyond the circumference of the lower shank portion and the at least one nail has a pointed terminus distal from the head, whereby the upper shank portion having a non-circular horizontal cross-section deforms the guide hole deformable interior portion such that at least one of the one or more nails bonds to the fixture with a tight friction fit.

29. The system for fastening a fixture to a vertical surface of claim 28, wherein at least one of the one or more nails provides a top threaded portion and a head having internal threads to threadedly attach the head to the threaded top portion.

30. The system for fastening a fixture to a vertical surface of claim 28, wherein at least one of the one or more nails provides a head having a knurled portion.

31. The system for fastening a fixture to a vertical surface of claim 28, wherein at least one of the one or more nails has a head portion that extends from the top of the shank by non-threaded means.

\* \* \* \* \*